United States Patent Office 3,467,444
Patented Sept. 16, 1969

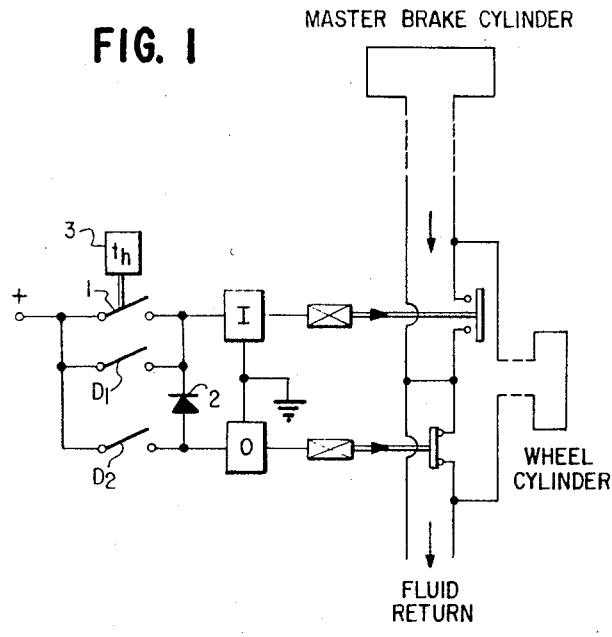
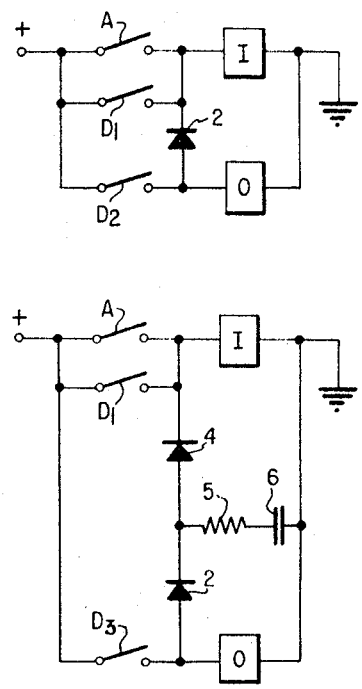
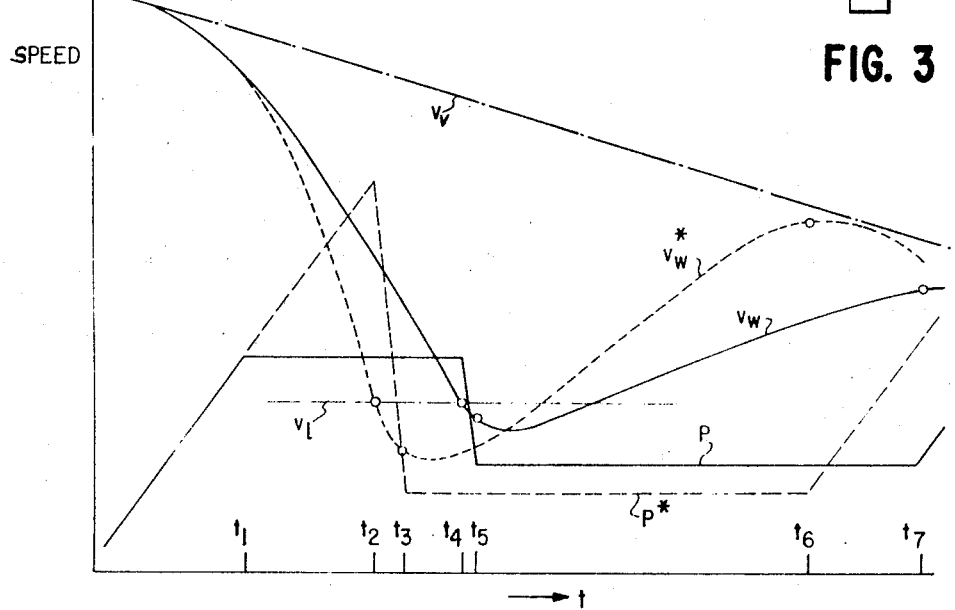
FIG. 1
FIG. 2
FIG. 3
FIG. 4
INVENTOR
Heinz Leiber

3,467,444
VEHICLE BRAKE CONTROL SYSTEM FOR PREVENTING WHEEL LOCKING
Heinz Leiber, Leimen, Germany, assignor to Teldix Luftfahrt-Ausrustungs G.m.b.H., Heidelberg-Wieblingen, Germany
Filed Feb. 21, 1968, Ser. No. 707,032
Claims priority, application Germany, Apr. 4, 1967, T 33,585
Int. Cl. B60t 8/04
U.S. Cl. 303—21                    4 Claims

ABSTRACT OF THE DISCLOSURE

A brake control system for wheeled vehicles for preventing a wheel from locking when a braking force is applied to it. The system includes a brake pressure line for delivering brake fluid to the brake assembly of the wheel, a normally open inlet valve connected to the brake like for permitting the brake fluid to enter the line and a normally closed outlet valve connected to the line for permititng the braking fluid to escape from the line. The inlet and outlet valves are actuated by means, responsive to the condition of rotational deceleration of the wheel, which closes the inlet valve when the wheel exceeds a lower threshold of rotational deceleration and opens the outlet valve when the wheel exceeds an upper threshold of deceleration. Time delay means are also provided for maintaining the inlet valve closed until the wheel has begun to accelerate.

Cross-reference to related application

The subject matter of this application is related to that disclosed in copending application Ser. No. 686,492 filed Nov. 29, 1967, of Heinz Leiber.

Background of the invention

The present invention relates to a vehicle brake control for preventing wheel locking; more particularly to a brake control system which momentarily lowers the braking force applied to a particular braked wheel to a reduced level after the wheel has exceeded a threshold of rotational deceleration.

Various types of brake control systems for preventing wheel locking have been proposed for wheeled vehicles having pneumatically or hydraulically actuated brakes. One of these systems is equipped with individually electromagnetically actuated inlet valves and outlet valves one each of which is arranged on each branch of the brake pressure line—which can include either a single, or a number of wheel brake cylinders—that is to be regulated.

This wheel-lock-preventing brake control system further includes an electrical switch contact that is actuated when the rotational deceleration of the wheel to be regulated exceeds a given threshold value. This switch contact is connected to the magnet windings of both the inlet and the outlet valve, so that, when it is closed, it actuates both valves; that is, it closes the inlet valve and opens the outlet valve. This brake control system is also provided with a second electrical switch contact which is either actuated by a time delay mechanism or in dependence upon the rotational acceleration of the wheel. This second switching contact is effective to control the operation of the inlet valve only; more particularly, it maintains the inlet valve in the closed position independently of the position of the deceleration-dependent first contact.

Summary of the invention

An object of the present invention is to improve this just-described brake control system to produce an exact control of the braking pressure in order to obtain the amount of wheel slippage that produces the highest friction between the wheel and the pavement.

Another object of the present invention is to improve the system described above so as to reduce the amount of brake fluid which escapes through the outlet valve.

These as well as other objects which will become apparent from the discussion that follows are achieved, according to the present invention, by providing a second deceleration-dependent contact that switches only the inlet valve when the rotational deceleration of the wheel reaches a threshold value which is lower than that of the first or main contact that actuates both valves.

In the brake control system of the prior art, the situation where both valves were closed and, thus, the braking pressure was retained at a constant level could only occur if a reduction in pressure directly preceded it. This meant that if the driver of the vehicle applied the brakes and thereby increased the braking pressure, a pressure drop would always occur, if the wheel exceeded a threshold of deceleration, immediately after a rise in pressure thus forming a pressure peak. The proposed additional deceleration contact which actuates in dependence upon a lower threshold value effects a closing of the inlet valve, and therefore, a maintenance of the brake pressure at a constant value, before the brake pressure reaches such a peak. The result is that all the brake pressure peaks will be cut off and a corresponding quantity of brake fluid will be saved. This effect is especially important in the case of hydraulic brake systems since the quantity of brake fluid produced under pressure by a master brake cylinder of given dimensions will then suffice for a greater number of cycles of operation of the brake control system.

It is important, in the brake control system of the type described above, that the inlet and the outlet valves not be allowed to "overlap": that is, that both valves not be allowed, even momentarily, to be open at once. This overlapping would permit brake fluid to freely flow through the inlet valve and out the outlet valve causing a drop in pressure in the brake system. Great care must, in consequence, be taken to insure that the inlet valve will be already closed when the outlet valve opens. In the brake control system of the prior art it was necessary to utilize all the possible means to shorten the time of actuation of the inlet valve. Since, in the brake control system according to the present invention, the additional deceleration contact will always act to close the inlet valve before the actuation of the so-called main contact that is connected to both valves and, thus, more time is allowed for the closing of the inlet valve, no special devices need be used to speed up the inlet valve.

The time of actuation of a solenoid valve is quite strongly dependent upon the inductance of the valve's magnetic winding. If, now, a higher inductance can be permitted, in accordance with the invention, since the time of actuation is no longer critical, the intensity of the excitation current may be considerably reduced while maintaining constant the magnetomotive force (that is, number of turns times the current in each turn). A reduction in the solenoid current advantageously saves wear on the switching contacts and, insofar as transistor switching amplifiers were necessary in the brake control systems of prior art, such amplifiers may be eliminated. A reduced excitation current in the inlet valve also effects advantages if a series RC circuit is used as a time delay device to maintain the inlet valve in the closed position.

Brief description of the drawings

FIGURE 1 is a schematic diagram of the electric circuit as well as a portion of the hydraulic circuit of the brake control system, according to a preferred embodiment of the present invention, having a contact which is actuated by a time delay device.

FIGURE 2 is a schematic diagram of the electric circuit of the brake control system, according to another preferred embodiment of the present invention, having a contact which is actuated in dependence upon the rotational acceleration of the braked wheel.

FIGURE 3 is a schematic diagram of the electric circuit of the brake control system, according to still another preferred embodiment of the present invention, having both a time delay device and an acceleration contact.

FIGURE 4 is a graph showing a family of curves which afford the basis of an explanation of the operation of the electric circuit of FIGURE 3.

Description of the preferred embodiments

Referring now to the drawing there is shown, in FIGURE 1, a portion of a hydraulic system which controls the braking pressure applied to a vehicle wheel or wheels to prevent their locking. As may be seen, the brake fluid is placed under pressure by a master brake cylinder, which pressure is applied through an inlet valve, to a wheel brake cylinder of the wheel to be controlled. If the pressure is so great as to cause the wheel to begin to lock it can be lowered by opening an outlet valve and allowing some of the brake fluid to escape. It is to this type of hydraulic control system which the controls according to the present invention and illustrated in FIGURES 1, 2 and 3 will be adapted.

FIGURE 1 also schematically illustrates the electric circuit portion of a brake control system according to one preferred embodiment of the present invention. A D.C. voltage source, designated by a plus sign, is connected to ground through a contact 1 and the winding I of the inlet valve of the hydraulic system. A second contact $D_1$ is connected in parallel to the contact 1. A third branch of the circuit connects the voltage source to ground through a third contact $D_2$ and the winding O of the outlet valve of the hydraulic control system. A diode 2 is connected, in addition, between the point of the circuit joining the contact $D_2$ and the winding O and the point joining the two other contacts and the winding I. This diode is poled so as to conduct current from the contact $D_2$ to the winding I; that is, when the contact $D_2$ is closed both windings O and I will be excited.

The electric circuit of FIGURE 1 is thus operative such that when the contact $D_2$ closes the inlet valve will close and the outlet valve open (causing the brake pressure to fall). When one of the two contacts 1, $D_1$ closes, only the winding I will be excited so that both valves will be closed (causing the brake pressure to remain constant). If all three contacts are open both the inlet and the outlet valve will be in their normal positions; that is, the inlet valve will be open and the outlet valve closed. In this case the effective brake pressure will be determined solely by the driver of the vehicle. It is when the inlet and outlet valves are in their normal positions, within a controlled braking cycle, that the brake pressure can rise.

The contacts $D_1$ and $D_2$ are made to switch in dependence upon the rotational deceleration of the vehicle wheel to be braked; they may, for example, be actuated in dependence upon spring mounted masses which rotate with the wheel. The threshold or actuating value of rotational deceleration which when exceeded results in a closing of the contact $D_1$ is lower than the actuating value of the main contact $D_2$. These values are normally expressed as decelerations at the wheel circumference and may lie in the range, for example, between 1 and $4g$.

When the rotational deceleration of the wheel rises above the respective thresholds or actuating values the contacts will close. It follows from this that the contacts will be actuated sequentially when the wheel is about to lock and its rotational deceleration is increasing.

The contact 1 is actuated by a time delay device 3 which closes the contact 1 shortly after the closing of the contact $D_2$ and opens it again after a prescribed holding time $t_h$. The time $t_h$ can be made dependent upon the ambient temperature, the driver determined braking force or any other parameters except those involving the conditions of rotational motion of the wheel.

According to the present invention the contact 1 can also close and the time $t_h$ can begin to run when the rotational deceleration of the vehicle wheel *falls below* either the lower or upper threshold of deceleration; that is, when either the contacts $D_1$ or $D_2$ open. In any case, the delay time $t_h$ should be made sufficiently long to permit the wheel to begin to accelerate before the inlet valve is allowed to open.

The circuit of FIGURE 1 operates, briefly, as follows: If, during a time when the driver is braking the vehicle, the rotational deceleration of the wheel in question rises above the lower threshold, the contact $D_1$ closes and actuates, that is, closes, the inlet valve. The braking pressure can therefore no longer increase, but, since the outlet valve is still in its normally closed position, it will remain constant. If, however, the braking pressure is still so high that it causes the deceleration of the wheel to further increase, the main contact $D_2$ will also close and actuate the outlet valve so that the brake pressure will fall. Shortly after the main contact $D_2$ closes, the contact 1 will then close too. When, as a result of the decreased braking effect, the rotational deceleration is reduced again, the contact $D_2$ will be the first to open; when it does, the brake pressure will remain constant. Thereafter, the contact $D_1$ and, at the end of a predetermined holding delay time, the contact 1 will also open so that the brake pressure can increase again.

Although the diode 2 is not necessary in the cycle of operation described above it increases the safety of the system since it prevents the situation, where both the inlet and the outlet valves are open, from occurring. This situation, which would result in the loss of a brake pressure in the entire braking system, might occur if the contact $D_1$ were incorrectly adjusted, or chattered, or failed altogether.

The arrangement shown in FIGURE 2 differs from the circuit of FIGURE 1 only in that the contact in parallel with the contact $D_1$, which is here designated with an A, is dependent upon the rotational acceleration of the wheel. This contact A, operating in a manner analogous to that of the deceleration contacts, closes when the rotational acceleration of the wheel exceeds a specific rotational acceleration threshold. After the termination of the closing and opening cycle of the contacts $D_1$ and $D_2$, therefore, the braking pressure is held constant until the wheel has accelerated to the speed of the vehicle. During the short span of a few milliseconds between the time the contact $D_1$ opens and the acceleration contact thereafter closes the braking pressure can, however, increase. This undesirable increase is prevented in the circuit shown in FIGURE 3.

The winding of the inlet valve, in the circuit of FIGURE 3, is provided with a time delay device in the form of an RC-element. To this end an additional diode 4 having the same polarity as diode 2 is inserted between the diode 2 and the contact $D_1$. A resistor 5 and a capacitor 6 connect the points of interconnection between the two diodes to ground.

The circuit of FIGURE 3 also differs vis-a-vis the circuit of FIGURE 2 in that the roational deceleration threshold value of the main contact, here designated $D_3$, is not a fixed value but varies with the rotational speed of the wheel. In particular, the deceleration threshold value is made to increase with increasing rotational speed of the wheel. It is also provided, further, that when the rotational speed of the wheel reaches a particular limiting speed $V_1$ the contact $D_3$ can no longer actuate at all. This feature of the preferred embodiment will be described in greater detail in the remaining portion of this specification with reference to the graph of FIGURE 4.

The graph of FIGURE 4, which sets forth an exemplary speed of a vehicle $V_v$ and a vehicle wheel $V_w$ against time $t$, illustrates the operation of the circuit of FIGURE 3. Since it is assumed that the vehicle has been braked starting at time $t=0$, the vehicle speed $V_v$, which is shown by the dotted-dashed line, falls with increasing time. The solid lines $V_w$ and P correspond, respectively, to the circumferential speed of the wheel and the brake pressure applied thereto by a brake which is regulated by a brake control system employing the circuit of FIGURE 3. The dashed lines $V_w^*$ and $P^*$ illustrate the time dependence of the speed of the wheel and brake pressure, respectively, for a wheel brake which is regulated with a control system of the type known in the prior art having no lower threshold contact $D_1$.

The operation of this latter brake control system without the lower threshold contact will first be described. It is assumed that when the brakes are initially applied by the driver of a vehicle the wheel in question will tend to lock; its speed $V_w^*$ will therefore sharply fall as is seen in FIGURE 4. The deceleration contact $D_3$ is not allowed to close, however, even if the deceleration threshold value is exceeded, until when the circumferential speed of the wheel falls below the limiting speed $V_1$ (the horizontal-dotted-dashed line). The brake pressure, which has been increasing up to this time $t_2$, will first quickly fall, until, at time $t_3$, the deceleration of the wheel falls below the threshold value and the main contact $D_3$ opens again. During the time in which $D_3$ was closed the capacitor 6 was charged through the diode 2 and the resistor 5. This capacitor now discharges through the diode 4 and the inlet valve winding so that the inlet valve will remain closed until the acceleration contact A closes and undertakes the excitation of this winding. The brake pressure remains constant, therefore, until, at time $t_6$, the acceleration contact opens again.

It may be seen from the discussion above that, already from about time $t_1$ to time $t_2$, the brake pressure is unnecessarily increased, even though the wheel is already in a condition of sharp deceleration. Because of this brake pressure increase, the pressure must subsequently be dropped way down by removing a considerable quantity of braking fluid medium from the brake pressure system.

In accordance with the preferred embodiment of the present invention that is illustrated in FIGURE 3, the lower deceleration threshold contact $D_1$ is actuated already at time $t_1$. As a result, the wheel speed and brake pressure will follow the path traced by the solid lines $V_w$ and P, respectively. From time $t_1$ the brake pressure will be held constant; that is, the triangular pressure peak shown by the dotted line $P^*$ will be cut off. Although speed of the wheel $V_w$ will also continue to fall as the wheel tends to lock, the deceleration will not be as great as in the preceding case. The limiting speed $V_1$, where the main contact $D_3$ closes and the pressure falls, will be reached somewhat later at time $t_4$. Since the deceleration of the wheel will not be as great as in the previous case, the main contact will open again quite shortly thereafter, at time $t_5$. This means that the pressure drop will be considerably less than in the previous case. As a result of the lower pressure drop, the speed of the wheel $V_w$ will increase at a slower rate and remain longer in the speed region where the friction between the wheel and the pavement is highest. In addition, the entire control cycle which ends at time $t_7$ will be made longer by the presence of the contact $D_1$ so that advantageously fewer control cycles will occur during a single braking of the vehicle.

It will be understood that the above description of the present invention is susceptible to various modifications, changes and adaptations. The expression "contact," for example, will be understood by persons skilled in the art in its most general sense to include electronic circuits of all types which can be made to switch in dependence upon the conditions of rotational motion of the controlled wheel or wheels. Indeed, the scope of the invention extends to every electronic as well as digital brake control system which prevents a wheel or wheels of a vehicle from locking and which is controlled in principle—that is, aside from the periods of delay inherent in the system—by the conditions of rotational motion of the wheel or wheels.

I claim:

1. A brake control system for wheeled vehicles for preventing wheel locking when a braking force is applied at the brake assembly of such wheel comprising, in combination:
   (a) a brake pressure line for delivering a braking fluid medium to the brake assembly of such wheel;
   (b) a normally open inlet valve connected to said line for permitting said braking fluid to enter said line;
   (c) a normally closed outlet valve connected to said line for permitting said braking fluid to escape from said line;
   (d) means responsive to the rotational deceleration of said wheel for closing said inlet valve when said wheel exceeds a lower threshold of rotational deceleration and for opening said outlet valve when said wheel exceeds an upper threshold of rotational deceleration;
   (e) time delay means for opening said inlet valve a prescribed time from the moment when said rotational deceleration falls below one of said thresholds of rotational deceleration.

2. The brake control system defined in claim 1, wherein said one threshold is said upper threshold.

3. The brake control system defined in claim 1, wherein said one threshold is said lower threshold.

4. The brake control system defined in claim 1, wherein said prescribed time is substantially longer than the time interval between said moment when said rotational deceleration falls below said one threshold of rotational deceleration and the moment when said wheel next begins to accelerate.

References Cited

UNITED STATES PATENTS 2,914,359  11/1959  Yarber.
3,066,988  12/1962  McRae.

MILTON BUCHLER, Primary Examiner

JOHN J. McLAUGHLIN, Jr., Assistant Examiner

U.S. Cl. X.R.

188—181; 303—68